(12) United States Patent
Hannington

(10) Patent No.: US 6,500,526 B1
(45) Date of Patent: Dec. 31, 2002

(54) RETROREFLECTIVE SHEETING CONTAINING A VALIDATION IMAGE AND METHODS OF MAKING THE SAME

(75) Inventor: Michael Hannington, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 134 days.

(21) Appl. No.: 09/672,184

(22) Filed: Sep. 28, 2000

(51) Int. Cl.[7] .................................................. B32B 3/00
(52) U.S. Cl. ........................ 428/195; 428/201; 428/202; 428/204; 428/267; 428/480; 428/483; 428/500; 428/522; 428/654 RL; 428/402; 428/403; 428/323; 359/2; 359/537; 156/60
(58) Field of Search ................................ 428/195, 201, 428/202, 204, 267, 480, 483, 500, 522, 654 RL, 402, 403, 323; 359/2, 537; 156/60

(56) References Cited

U.S. PATENT DOCUMENTS

| | | | |
|---|---|---|---|
| 4,505,967 A | * 3/1985 | Bailey | |
| 4,645,301 A | 2/1987 | Orensteen et al. | 380/54 |
| 4,650,283 A | 3/1987 | Orensteen et al. | 359/537 |
| 4,664,966 A | 5/1987 | Bailey et al. | 428/203 |
| 4,688,894 A | 8/1987 | Hockert | 359/537 |
| 4,691,993 A | 9/1987 | Porter et al. | 359/537 |
| 4,725,494 A | 2/1988 | Belisle et al. | 428/325 |
| 5,510,171 A | 4/1996 | Faykish | 428/195 |
| 5,656,360 A | 8/1997 | Faykish et al. | 428/195 |
| 5,866,236 A | 2/1999 | Faykish et al. | 428/195 |

* cited by examiner

*Primary Examiner*—Leszek Kiliman
(74) *Attorney, Agent, or Firm*—Renner, Otto, Boisselle & Sklar, LLP

(57) ABSTRACT

This invention relates to retroreflective sheeting that has an image, such as a validation image. In one embodiment, the image is directional having varying appearance at different angles of view.

The retroreflective sheeting comprises a layer of transparent microsphere lenses, a transparent polymeric spacing layer having a front surface and a back surface wherein the spacing layer is underlying, contacting, and substantially conforming to the bottom of the lenses, and the spacing layer comprises one or more segments having a refractive index different from the refractive index of the remainder of the spacing layer, a reflective layer having a top surface and a bottom surface wherein the top surface is in contact with the back surface of the spacing layer, and a topcoat cover sheet overlying and conforming to the top surfaces of the lenses and having a flat top surface or face. In another embodiment, the retroreflective sheeting includes a pressure sensitive or thermally activated adhesive layer underling and in contact with the bottom surface of the reflective layer. The retroreflective sheeting has an image whose proportions are determined by the variation of refractive index of the one or more segments from the refractive index of the remainder of the spacing layer, and by its conformation to the bottom of the lenses. The image of the present invention can range from conspicuous to inconspicuous and directional to non-directional.

39 Claims, 4 Drawing Sheets

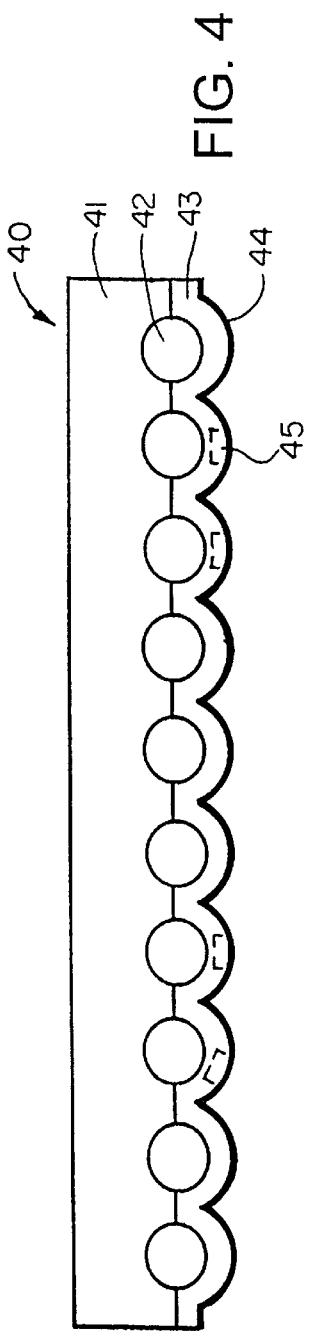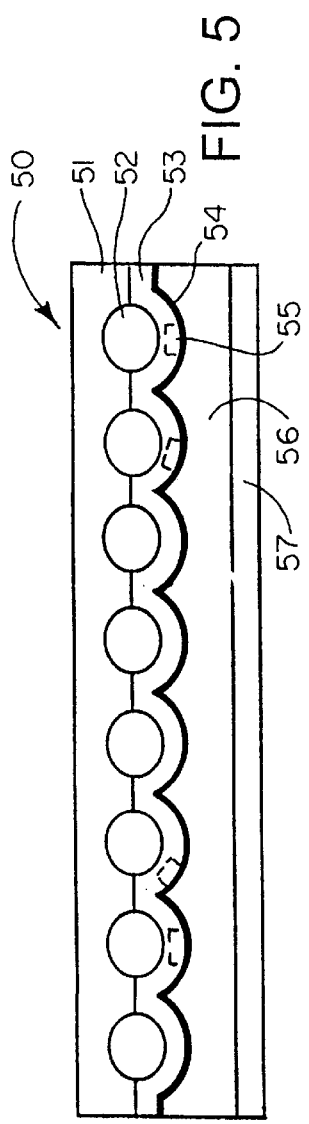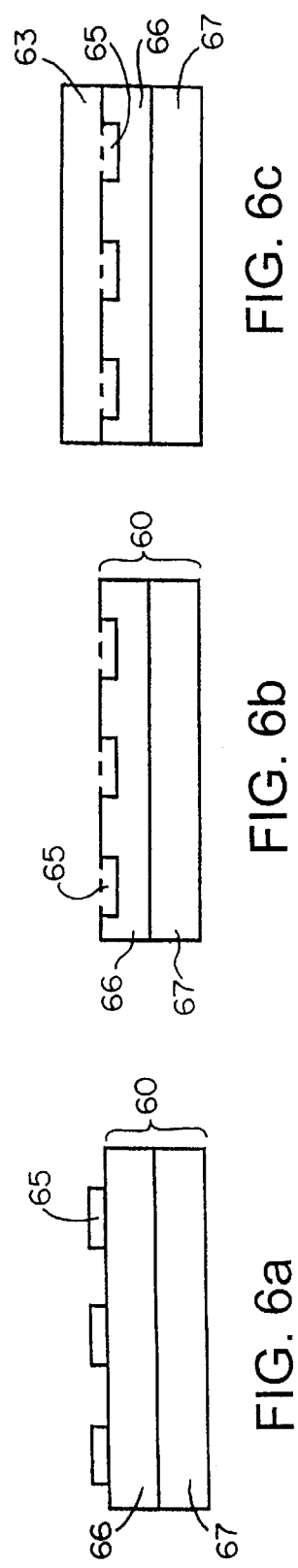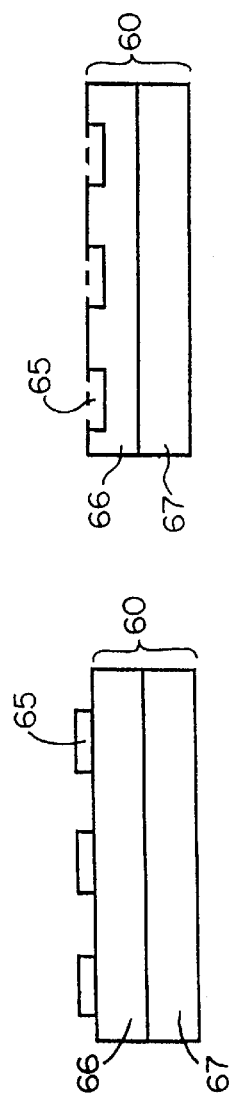

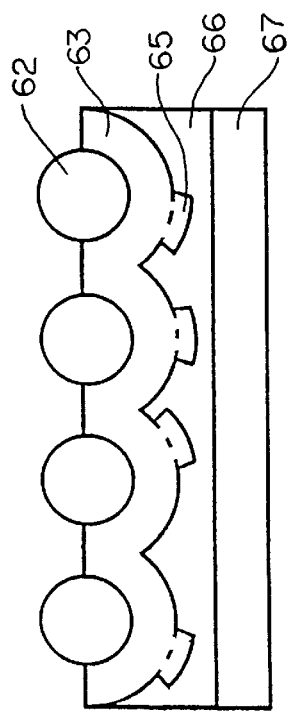
FIG.6d
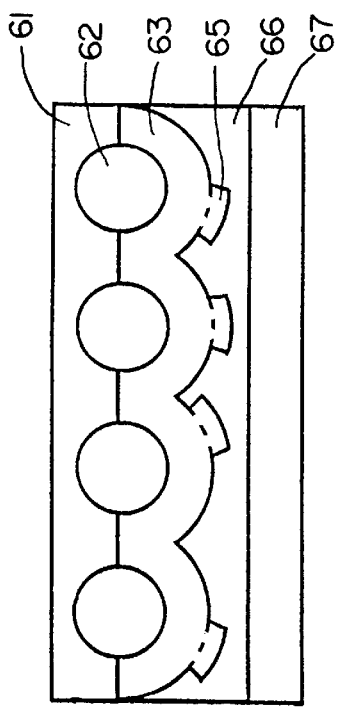
FIG. 6e
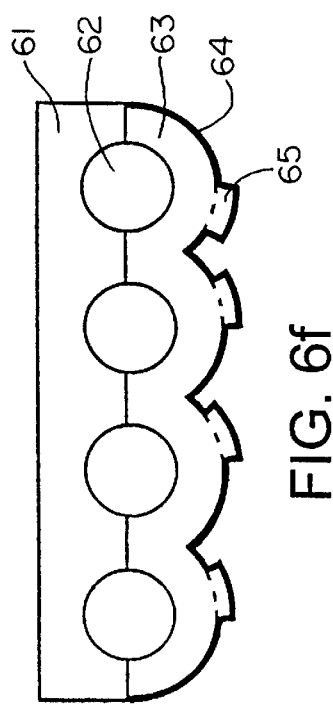
FIG. 6f
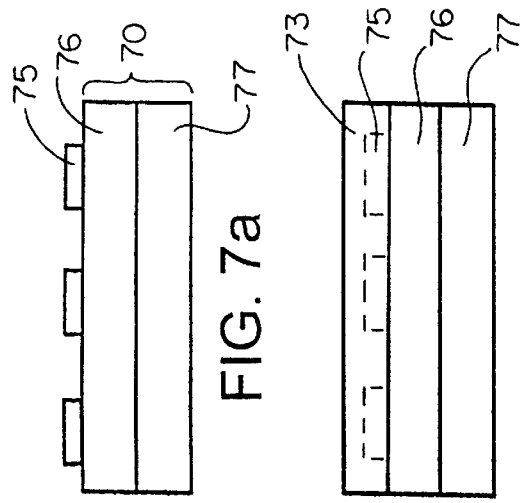
FIG. 7a
FIG. 7b

RETROREFLECTIVE SHEETING CONTAINING A VALIDATION IMAGE AND METHODS OF MAKING THE SAME

FIELD OF THE INVENTION

The present invention relates to retroreflective sheeting with an image and more specifically a validation image.

BACKGROUND OF THE INVENTION

Validation images have been used for years for authentication and security purposes. A watermark is an identifying pattern or legend either on or in a material to provide validation of the material. Retroreflective sheeting with directional and non-directional watermarks have been used as a validation means for documents, phonographs, cassette tapes, compact disk containers, traffic signage and license plates.

One problem with watermarks on retroreflective material is providing the watermark in a manner which provides the needed authentication but which provides some subtlety or inconspicuousness, such as being discernable in only a few angles of viewing. Expensive processing steps and equipment are often required to provide such a watermark. Additionally, there is generally little processing control over the conspicuousness or intensity of the watermark.

It is desirable to have an image that is distinct and viewable for authenticating purposes. Further, it is desirable to have a processing means to provide the desired intensity of the image. It is also desirable to have an image that is subtle and directional.

SUMMARY OF THE INVENTION

This invention relates to retroreflective sheeting that has an image, such as a validation image. In one embodiment, the image is directional having varying appearance at different angles of view.

The retroreflective sheeting comprises a layer of transparent microsphere lenses, a transparent polymeric spacing layer having a front surface and a back surface wherein the spacing layer is underlying, contacting, and substantially conforming to the bottom of the lenses, and the spacing layer comprises one or more segments having a refractive index different from the refractive index of the remainder of the spacing layer, a reflective layer having a top surface and a bottom surface wherein the top surface is in contact with the back surface of the spacing layer, and a topcoat cover sheet overlying and conforming to the top surfaces of the lenses and having a flat top surface or face. In another embodiment, the retroreflective sheeting includes a pressure sensitive or thermally activated adhesive layer underling and in contact with the bottom surface of the reflective layer. The retroreflective sheeting has an image whose proportions are determined by the variation of refractive index of the one or more segments from the refractive index of the remainder of the spacing layer, and by its conformation to the bottom of the lenses. The image of the present invention can range from conspicuous to inconspicuous and directional to non-directional.

BRIEF DESCRIPTION OF THE DRAWINGS

FIG. 4 is a cross sectional view of a retroreflective sheeting of the invention.

FIG. 5 is a cross sectional view of a retroreflective sheeting of the invention.

FIGS. 6a–6f illustrate a method of preparing a retroreflective sheeting of the invention.

FIGS. 7a–7e illustrate an alternative method of preparing a retroreflective sheeting of the invention.

DESCRIPTION OF THE PREFERRED EMBODIMENTS

Figure 1:
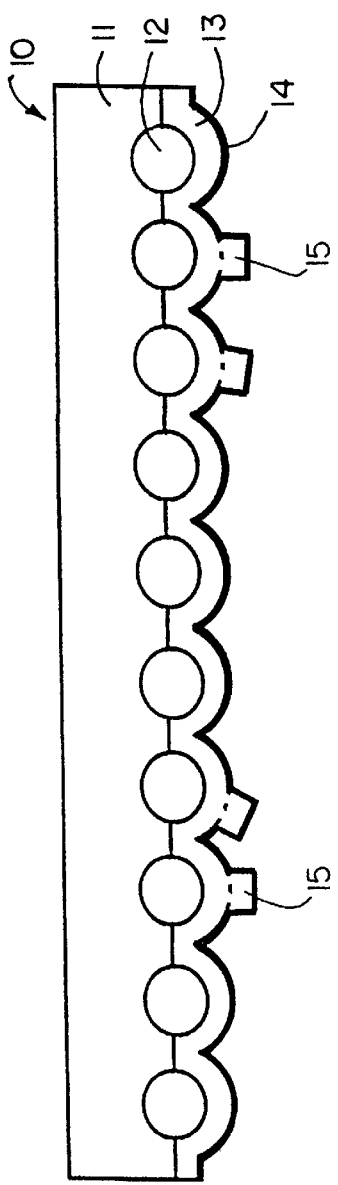
FIG. 1 is a cross sectional view of a retroreflective sheeting of the invention.

As described herein, the invention relates to a retroreflective sheeting which has an image and which comprises, in one embodiment, a layer of transparent microsphere lenses, a transparent polymeric spacing layer comprising one or more segments of a polymer having a refractive index different from the refractive index of the remainder of the spacing layer, a reflective layer in contact with and conforming to the back surface of the spacing layer, and a topcoat overlying and conforming to the top surface of the lenses and having a flat top surface. The image results from the presence and location of the segments since the segments, having a different refractive index than the remainder of the spacing layer, do not provide the same magnitude of reflectivity as the remainder of the spacing layer.

In one embodiment, the segments are within the general configuration of the spacing layer. The reflectivity of the segments of varying refractive index can range from "dead" or nonreflecting segments, to less reflecting segments, or to greater reflecting segments in the retroreflective sheeting. This difference in reflective characteristic leads to the image's viewability. The viewability of the resultant image is dependant on the thickness of the segment and of the variation in refractive index from that of the spacing layer.

In another embodiment the segments protrude outside of the general configuration of the spacing layer. The reflectivity of the segments of varying refractive index can range from "dead" or nonreflecting segments, to less reflecting segments, or to greater reflecting segments in the retroreflective sheeting. This difference in reflective characteristic leads to the image's viewability. The viewability of the resultant image is dependent on the thickness of the segment and of the variation in refractive index from that of the spacing layer. It should be noted that the thickness of the segment in this embodiment will result in a change in reflective characteristic even if there is no variation in refractive index from that of the spacing layer. However varying the refractive index of the segments outside the general configuration of the spacing layer will result in a greater magnitude of variation.

As described above, the retroreflective sheeting of the invention has a layer of transparent microsphere lenses. The microsphere lenses may have any refractive index or average diameter provided that the beads provide the necessary refraction for the retroreflective application. Typically the microsphere lenses are characterized as having an average refractive index in the range of about 1.8 to about 2.5, or from about 1.9 to about 2.4, or from about 2.1 to about 2.3. The transparent microsphere lenses utilized in the retroreflective sheeting of the present invention may be characterized as having average diameters in a range of from about 25 to about 400, or from about 30 to about 150, or from about 30 to about 120 microns, and more often in a range from about 40 to about 80 microns. Here and elsewhere in the specification and claims the range and ratio limits may be combined.

Glass microspheres are typically used although ceramic microspheres such as those made by sol/gel techniques can also be used. Any of the transparent microspheres previously used in the art to prepare retroreflective sheeting can be used herein. The microspheres can be subjected to chemical or physical treatments to improve the bond of the microspheres to the polymeric films. For example, the microspheres can be treated with a fluorocarbon or an adhesion promoting agent such as an aminosilane to improve the bond, or the spacing layer in which the lenses have been embedded can be subjected to a flame treatment or corona discharge to improve the bond between the spacing layer and the lenses to the subsequently applied topcoat.

The retroreflective sheeting also has a polymer spacing layer generally conforming to the bottom surface of the microsphere lenses. The spacing layer fills the space between the microspheres and the reflective layer. The segments described herein are part of the spacing layer. The thickness of the polymeric spacing layer or space coat will depend on the ratio of the index of refraction of the microspheres to that of the space coat and topcoat, and the diameter of the microspheres. The space coat must be sufficiently thick as to position the specularly reflective layer at the approximate focal plane for the light rays passing through the microspheres. Generally the spacecoat thickness is from about 25% to about 100%, or from 40% to about 60% of the average diameter of the microsphere lenses. Thus the thickness of the spacing layer may be from about 20 to about 300 microns, and more often from about 40 to about 90 microns. Various thermoplastic polymeric resins have been used previously in forming the spacing layer of retroreflective sheeting, and such resins can be used in the sheeting of the present invention. The resins that may be used for the spacing layer include a variety of partially amorphous or semi-crystalline thermoplastic polymers which generally have a soft stage during which the lenses can be embedded in the films. The material used to form the spacing film or layer should be compatible with the topcoat material and adapted to form a good bond with the topcoat (and the microsphere lenses). Preferably, the adhesion between the material is greater than the tensile strength of the materials. Acrylics, polyvinyl butyrals, aliphatic urethanes and polyesters are particularly useful polymer materials because of their outdoor stability. Copolymers of ethylene and an acrylic acid or methacrylic acid; vinyl polymers and copolymers; fluoropolymers; polyethylenes; cellulose acetate butyrate; polycarbonates; and polyacrylates are other examples of polymers that can be used for the spacing layer of the sheeting of the invention. In one embodiment it is desirable to use materials having elastomeric properties to provide retroreflective sheeting which may be repeatedly stretched or flexed, and upon release of the stretching or flexing tension, rapidly return to substantially their original dimensions without significant loss of retroreflectivity. Certain polyurethanes are available commercially which possess such elastomeric properties and these materials can be used as spacing layer materials.

As noted above, the spacing layer contains segments or sections which have a refractive index which is different from the refractive index of the remainder of the spacing layer. The refractive index of the segments may be higher or lower than the refractive index of the remainder of the spacing layer. Generally, however, the refractive index of the spacing layer (typically around 1.48 to 1.52) is lower than that of the segments. Any difference in the refractive index will result in an image. In one embodiment, the difference in the refractive indices is at least about 0.01. In other embodiments the difference is at least about 0.04 or 0.05. The thickness of the segment may range from about 0.1% to about 100% of the thickness of the spacing layer. In one embodiment the thickness of the segments is from about 0.1% to about 30% of the thickness of the spacing layer.

A wide variety of polymer materials can be utilized to form the image (or segments) provided the refractive index requirement is achieved. Any of the polymers described above for the spacing layer can be used in forming the segments provided the desired difference in refractive index is obtained. In one embodiment, particularly useful materials include, halogenated polymers, acrylic polymers, polyurethanes and polyesters. Specific examples of polymer combinations for the spacing layer and the segments include the following:

| Spacing Layer | | Segment | |
|---|---|---|---|
| Material | Refractive Index | Material | Refractive Index |
| Polyvinyl Butyral | 1.49[a] | Polyester[b] | 1.6–1.7 |
| Poly(vinyl acetate) | 1.50 | Polybutyl acrylate | 1.39 |
| Poly(vinyl acetal) | 1.48 | Poly(4-methylcyclohexyl methacrylate | 1.55 |
| Poly(isobutyl methacrylate) | 1.48 | Poly(ethylene glycol phthalate) | 1.53 |
| Polyvinyl Butyral | 1.49[a] | Polyvinylidene difluoride | 1.42 |

[a]"Butyar" from Solutia (Monsanto).
[b]"Vitel" from Bostik.

The retroreflective sheeting of the invention also comprises a topcoat overlying and conforming to the top surface of the microsphere lenses and having a flat top or face surface. The coating weight of the topcoat may range from about 25 to 175 gms/m$^2$. Preferably the coating weight is about 50 to 150 gms/m$^2$ and more preferably is from about 60 to 120 gms/m$^2$. The topcoat thickness may range from about 25 microns to about 300 microns and more often is from about 50 to about 100 microns. The topcoat may comprise various thermoplastic polymers including acrylic polymers such as polymethylmethacrylate; vinyl polymers such as PVC and vinyl acrylic copolymers; and polyurethanes such as aliphatic polyether urethanes. More specific examples of topcoat materials include an impact modified polymethylmethacrylate (PMMA) (e.g., Plexiglas™ acrylic DR, MI-7 (Rohm & Haas), Perspex™ acrylic HI-7 (ICI), or blends thereof); a vinyl acrylic formulation (methyl methacrylate/butyl methacrylate) copolymer and a PVC homopolymer) or aliphatic polyurethanes such as described in U.S. Pat. No. 6,054,208 (Rega et al.). The disclosure of useful aliphatic polyurethanes contained in U.S. Pat. No. 6,054,208 is hereby incorporated by reference.

The topcoat may be applied over the microspheres by standard coating methods such as curtain coating, slot die coating, reverse roll coating, knife over roll coating, air knife coating, gravure coating, reverse gravure coating, offset gravure coating, Meyer rod coating, etc. It is also possible to cast the topcoat film as a separate single layer film using these coating techniques. The topcoat film can be cast on a polymer covered paper casting sheet or a polymer casting sheet. Casting sheet products are well known to the industry and supplied by companies such as Felix Schoeller Technical Papers, Pulaski, N.Y., S. D. Warren of Newton Center, Massachusetts and Ivex Corporation of Troy, Ohio. To achieve proper performance and coat weight thickness in each of the coating operations, technical expertise is applied to determine the optimal solution viscosity. The application of these coating techniques is well known in the industry and can effectively be implemented by one skilled in the art. The knowledge and expertise of the manufacturing facility applying the coating determine the preferred method. Further information on coating methods can be found in "Modern Coating and Drying Technology," by Edward Cohen and Edgar Gutoff, VCH Publishers, Inc., 1992. Extrusion is an alternate method of forming a urethane film. Alternatively the topcoat film can be extruded.

In another embodiment the topcoat may comprise two or more polymer layers. These layers may consist of any of the aforementioned materials and may be formed by casting or by coextrusion. The separately prepared mono or multilayer topcoat films can be laminated to the top of the microspheres by the application of heat and pressure. The monolayer film or the inner layer of a multilayer film is softened sufficiently to flow around the top of microspheres. In another embodiment the monolayer or multilayer topcoat may be bonded to the microspheres by layer of adhesive, which adhesive is in intimate contact with and conforms to the microspheres. Various adhesives can be utilized, and pressure sensitive adhesives are used in one embodiment. One specific example of a useful adhesive is AS352RX acrylic adhesive from Avery Chemical in Mill Hall Pa. The topcoat and/or the pressure sensitive adhesive can be colored with a transparent pigment or dye. The topcoat may be printed with a graphic which can be located on the interior (buried) or the exterior of the topcoat, or even between layers of a multilayer topcoat. In yet another embodiment the pressure sensitive adhesive can be replaced by a thermal bonding layer, a heat activated adhesive, or a material which forms chemical bonds to the cover sheet.

The retroreflective sheeting of the invention also comprises a reflective layer having a top surface and a bottom surface where the top surface is in contact with and generally conforms to the back surface of the spacing layer. The reflective materials of the reflective layer may be, for example, silver or aluminum metal, and the layer can be applied by techniques well known to those skilled in the art such as by vapor deposition. Thus, a reflective layer of silver or aluminum metal can be vapor deposited over the bottom surface of the spacing layer (including the segments) at a thickness of generally between 500 and 1000 nanometers. The required thickness varies based on the type of reflective material chosen.

The reflective sheeting may also include a layer of pressure sensitive adhesive in contact with the reflective layer, and, optionally, a release liner. For example, an adhesive layer can be applied to the bottom of the reflective layer to protect the reflective layer and to serve a functional purpose such as adhering the sheeting to a substrate. Conventional pressure-sensitive adhesives such as acrylic-based adhesives, or heat- or solvent-activated adhesives are typically used and may be applied by conventional procedure. For example, a preformed layer of adhesive on a carrier web or release liner can be laminated to the reflective layer. Conventional release liners can be utilized in the formation of the retroreflective sheeting of the present invention.

In other embodiments, a protective transparent or transparently colored film may be applied (generally with an adhesive) over the topcoats of the reflective sheetings of the invention. The composition of the protective layer, also referred to herein as the "overcoat film", is selected to provide the surface of the retroreflective sheeting with additional desired properties such as improved cleanability and resistance to weathering, cracking, and dirt pick up. For example graffiti which is placed on such overlaminate films can be easily removed by washing. Examples of useful overlaminate films include PVC and various fluoropolymer films such as Tedlar, ETFE, polyvinylidene difluoride (PVDF), etc. Tedlar is available from DuPont and comprises polyvinyl fluoride. ETFE, also available from DuPont, is a copolymer of ethylene and tetrafluoroethylene. ETFE is described in more detail in the Encyclopedia of Polymer Science and Technology, Supplement No. 1, 1976 at pages 268–277.

The protective films or overcoats generally are applied to the sheeting with an adhesive, more specifically a pressure sensitive adhesive. The adhesive layer is first applied to a release sheet, and a film (e.g., cast film) of polymer such as Tedlar, PVC or ETFE is applied over the exposed side of the adhesive layer. When it is desired to apply the protective film and adhesive layer to the reflective sheeting, the release sheet is removed (the adhesive layer is transferred to the protective film), and the adhesive layer is brought into contact and adhered to the topcoat layer of the reflective sheeting.

Various embodiments of the retroreflective sheeting of the invention are further illustrated in the drawings. In FIG. 1, retroreflective sheeting 10 comprises glass microspheres 12 which are embedded in and adhered to spacing layer 13. The glass microspheres are also covered by and adhered to topcoat 11. The images are shown as segments 15 which are characterized as having a refractive index which is different from the reflective index of the spacing layer 13. A reflecting layer 14 covers the back surface of the space coat 13 including the segments 15. It should be noted that although the segments are shown in relationship to a single microsphere for clarity, they can extend over a series of microspheres as well.

Figure 2:
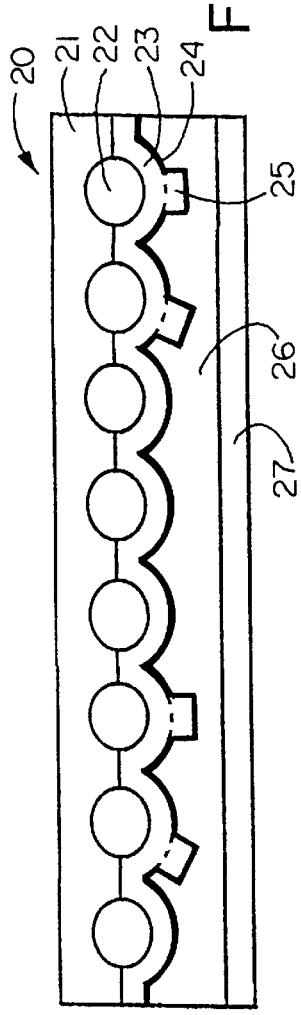
FIG. 2 is a cross sectional view of a retroreflective sheeting of the invention.

FIG. 2 illustrates a retroreflective sheeting similar to that shown in FIG. 1 with the addition of a pressure sensitive adhesive 26 and a release liner 27. Thus, in FIG. 2, retroreflective sheeting 20 comprises microspheres 22 which are embedded in spacing layer 23, and the microspheres are covered by topcoat 21. The images are shown as segments 25, and the back surface of the spacing layer 23 including the segments 25 is coated with reflective layer 24. A pressure sensitive adhesive layer 26 is in contact with the lower surface of the reflective surface 24, and a release liner 27 is in contact with and adhered to the adhesive layer 26.

Figure 3:
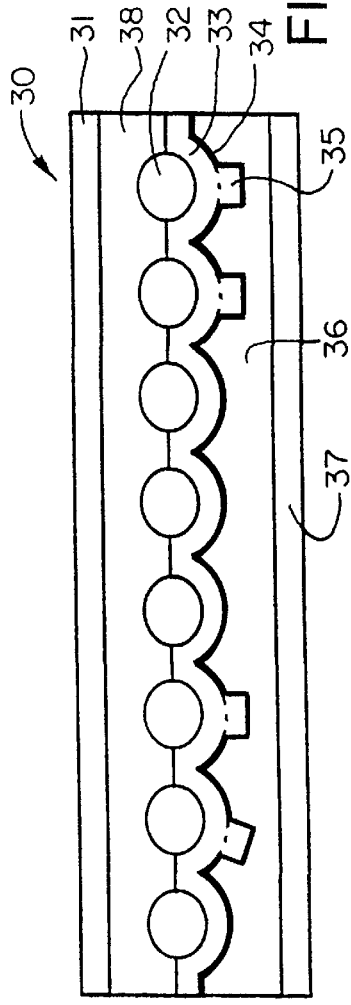
FIG. 3 is a cross sectional view of a retroreflective sheeting of the invention.

FIG. 3 illustrates another embodiment of a sheeting similar to FIG. 2 with the addition of an adhesive layer 38 between the topcoat 31 and the microspheres 32. Retroreflective sheeting 30 comprises microspheres 32 embedded in spacing layer 33 which has been printed with images represented by segments 35. The back surface of the spacing layer 33, including the segments 35, has been coated with reflective surface 34. A layer of adhesive 36 is in contact with the bottom surface of the reflective layer 34, and the lower surface of the adhesive layer 36 is in contact with release liner 37. A topcoat 31 is adhered to the lenses 32 and the top surface of the spacing layer 33 by adhesive layer 38.

FIGS. 4 and 5 illustrate other embodiments of the retroreflective sheeting of the present invention where the image has been incorporated into the body of the spacing layer. Thus, FIG. 4 illustrates a retroreflective sheeting 40 comprising microspheres 42 embedded in spacing layer 43 where the images are represented by segments 45 which are shown as being within the normal pattern of the spacing layer, and the spacing layer 43, including segments 45, is covered with reflecting surface 44. A topcoat 41 is positioned above and in contact with the microspheres 42 and spacing layer 43.

In the embodiment illustrated in FIG. 5, retroreflective sheeting 50 comprises microspheres 52 embedded in spacing layer 53 which contains the images represented as segments 55. The lower surface of the spacing layer 53, including segments 55, is covered with reflective surface 54. An adhesive layer 56 is in contact with and adhered to the lower surface of the reflective layer 54, and the adhesive layer 56 is releasably attached to a release liner 57. A topcoat 51 is positioned above and in contact with the microspheres 52 and the spacing layer 53.

The retroreflective sheets of the present invention can be made by procedures normally used in the industry. FIGS. 6a–6f illustrate one method of preparing retroreflective sheeting as illustrated in FIGS. 1–3. As shown in FIG. 6a, the sheeting of the invention can be prepared for by first printing an image 65 using a transparent polymer or a transparently colored polymer onto a molding layer surface of a first assembly 60 which comprises a molding layer 66 and a substrate 67. As discussed above, the refractive index of the transparent polymer or transparently colored polymer utilized to print the image should be different from the refractive index of the material ultimately selected for the spacing layer of the refractive sheeting. The image can be printed on the molding layer surface of the first assembly 60 using common printing techniques such as Flexography (flexo) and Rotogravure (gravure). The molding layer 66 may comprise any polymer which will assume the shape of the microspheres when the microspheres are subsequently embedded into the spacing layer (see FIG. 6d). Polyolefins such as polymers and copolymers of ethylene and propylene are useful. A high density polyethylene is an example of a particular polymer useful in forming the molding layer. In FIG. 6b, the image 65 is embedded into the molding layer 66 using heat and pressure. In FIG. 6c, a spacing layer 63 of desired thickness is extruded or cast onto the imaged molding layer 66 containing embedded segments 65, and the spacing layer is dried if necessary. The spacing layer is heated to provide a tacky surface upon which microspheres 62 are cascade-coated to form a mono layer of the microspheres. Typically, heat and/or pressure can be applied at this stage to facilitate embedding of the microspheres into the spacing layer 63 as shown in FIG. 6d. The spacing layer 63 is molded by the molding layer 66 to a contour which is substantially parallel to the microsphere surfaces, and the image (segments 65) remains substantially intact. The microspheres generally are embedded into the layer to a depth of about one-half of the average diameter of the microspheres. In carrying out this procedure, materials for the spacing layer 63 and the molding layer 66, and the conditions (for example, heat and/or pressure) should be selected to ensure that the spacing layer 66 adapts a contour substantially parallel to the microspheres surfaces and that the image segments remain substantially intact.

In FIG. 6e, a topcoat 61 is applied by standard coating methods such as described above. It is also possible to cast a topcoat as a separate, single layer film utilizing these coating techniques, or a single layer or multilayer topcoats can be separately formed by coextrusion. The separately formed single layer or multilayer films can then be laminated to the microspheres and spacing layer as a topcoat by using heat and pressure or an adhesive such as illustrated in FIG. 3. The topcoat layer 61 optionally can be printed such as with transparent UV radiation curable inks to provide monocolor or multicolor images.

To achieve proper performance and coat weight thickness in each of the coating operations, technical expertise is utilized to determine the optimal solution viscosity. The application of these coating techniques is well known in the industry and can be effectively implemented by one skilled in the art. The knowledge and expertise, as well as the equipment available at a manufacturing facility applying the coating will determine the preferred method. Further information on coating methods can be found in "Modern Coating and Drying Technology," by Edward Cohen and Edgar Gutoff, VCH Publishers, Inc., 1992.

The first assembly 60 including the molding layer 66 and substrate 67 are then stripped from the imaged spacing layer. In FIG. 6f a reflective layer 64 has been applied to the exposed back surface of the spacing layer 63 including segments 65. For example, a reflective layer of silver or aluminum metal can be applied by vapor deposition over the back surface of the imaged spacing layer. The topcoat layer 61 can optionally be printed with UV radiation curable inks to provide mono color or multicolor images.

In yet another embodiment (not shown), the retroreflective sheeting described above in FIG. 6e is provided with a pressure sensitive adhesive construction. In this embodiment, a pressure sensitive adhesive is coated onto a release coated liner (paper or polymer), and thereafter, the adhesive coated liner is pressure laminated to the exposed surface of the reflective layer 64. As illustrated in FIGS. 2 and 5, the pressure sensitive adhesive conforms to the shape of the reflective surface and becomes intimately bonded to the reflective surface. The release coated liner can be subsequently removed leaving the pressure sensitive adhesive adhered to the reflective layer, and the reflective sheeting can be applied adhesively to other surfaces.

Figure 7D:
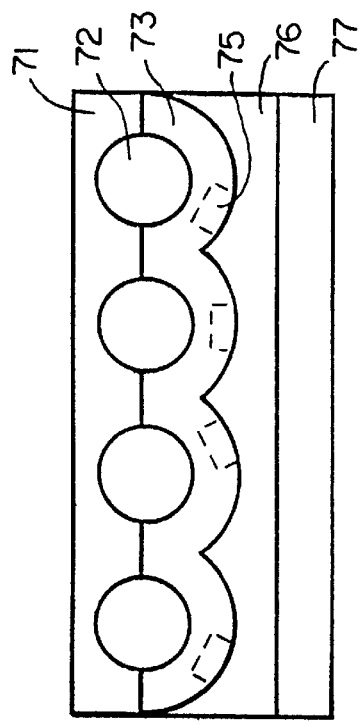

FIGS. 7a–7e illustrate an alternative method of preparing the retroreflective sheets of the present invention. This embodiment is generally similar to the embodiment illustrated in FIGS. 6a–6f except that the image which is printed on the molding layer surface of the first assembly is not embedded into the molding layer. FIG. 7a illustrates a molding assembly 70 which comprises a molding layer 76 and a substrate 77 upon which has been printed an image 75 using a transparent polymer or a transparently colored polymer. As discussed above, the refractive index of the transparent polymer or transparently colored polymer utilized to print the image should be different from the refractive index of the material selected for the spacing layer of the refractive sheeting. The first assembly utilized in this embodiment is the same as the first assembly described above with regard to the embodiment illustrated in FIGS. 6a–6e.

Figure 7C:
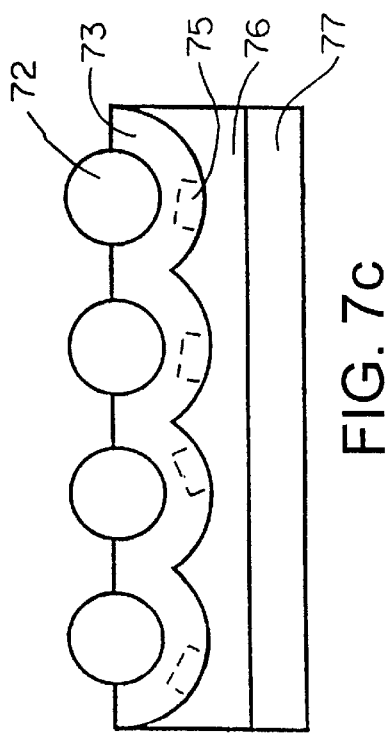

In FIG. 7b, a spacing layer 73 of the desired thickness is extruded or cast onto the imaged molding layer 76 containing segments 75. Subsequently spacing layer 73 is heated to provided a tacky surface upon which microspheres 72 are cascade-coated to form a mono layer of microspheres. The microspheres 72 then are embedded into spacing layer 73 as shown in FIG. 7c, typically by application of heat and/or pressure. The spacing layer 73 is molded by the molding layer 76 to a contour which is substantially parallel to the microsphere surfaces, and the image (segments 75) remains substantially intact within the spacing layer 73. Topcoat 71 then is applied by standard coating methods as described above and as shown in FIG. 7d.

The molding layer 76 and the substrate 77 are then stripped from the imaged spacing layer leaving the back surface of the imaged spacing layer exposed. A reflective layer 74 is then applied to the exposed back surface of the imaged spacing layer as shown in FIG. 7e.

Figure 7E:
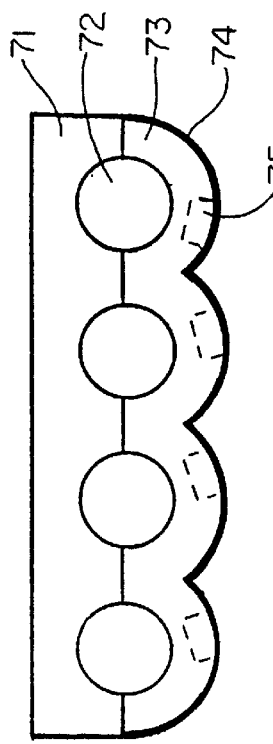

Optionally, and not shown in FIG. 7a–e, the retroreflective sheeting shown in FIG. 7e is provided with a pressure sensitive adhesive construction. In this embodiment, a pressure sensitive adhesive is coated onto a release coated liner (paper or polymer), and thereafter, the adhesively coated liner is pressure laminated to the exposed surface of the reflective layer. As illustrated in FIGS. 2 and 5, the pressure sensitive adhesive layer conforms to the shape of the reflective surface and becomes intimately bonded to the reflective surface. The release coated liner can be subsequently removed leaving the pressure sensitive adhesive adhered to the reflective layer, and the reflective sheeting can be applied adhesively to other surfaces.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An image-containing retroreflective sheeting comprising a layer of transparent microsphere lenses, a transparent polymeric spacing layer having a front surface and a back surface wherein the front surface of the spacing layer is in contact with and conforms to the bottom of the lenses wherein the spacing layer comprises one or more segments with a refractive index differing from the refractive index of the remainder of the spacing layer, a reflective layer having a top surface and bottom surface wherein the top surface is in contact with the back surface of the spacing layer, and a topcoat overlying and conforming to the top surfaces of the lenses and having a flat top surface.

2. The retroreflective sheeting of claim 1 wherein the microspheres have an average refractive index in the range of about 1.8 to about 2.5.

3. The retroreflective sheeting of claim 1 wherein the microspheres comprise glass microspheres with an average diameter in a range of from about 30 to about 200 microns.

4. The retroreflective sheeting of claim 1 wherein the spacing layer comprises an acrylic polymer, a polyvinyl butyral, an aliphatic urethane or a polyester.

5. The retroreflective sheeting of claim 1 wherein the spacing layer comprises a polyvinyl butyral or an acrylic polymer.

6. The retroreflective sheeting of claim 5 wherein the segments comprise a polyester or a polyurethane.

7. The retroreflective sheeting of claim 1 wherein the spacing layer comprises a polyester or a polyurethane.

8. The retroreflective sheeting of claim 7 wherein the segments comprises a polyvinyl butyral or an acrylic polymer.

9. The retroreflective sheeting of claim 1 wherein one or more of the segments are transparently colored.

10. The retroreflective sheeting of claim 1 wherein the refractive index of the segments differs from the refractive index of the remainder of the spacing layer by a value of at least about 0.04.

11. The retroreflective sheeting of claim 1 wherein the refractive index of the segments differs from the refractive index of the remainder of the spacing layer by a value of at least about 0.05.

12. The retroreflective sheeting of claim 1 wherein the thickness of the polymeric spacing layer is from about 25% to about 100% of the diameter of the lenses.

13. The retroreflective sheet of claim 1 wherein the topcoat has a thickness from about 25 microns to about 300 microns.

14. The retroreflective sheeting of claim 1 wherein the topcoat is derived from at least one acrylic polymer, a vinyl polymer, or polyurethanes.

15. The retroreflective sheeting of claim 1 wherein the topcoat is adhered to the lenses by an adhesive layer.

16. The retroreflective sheeting of claim 15 wherein the adhesive layer comprises a pressure sensitive adhesive, and the topcoat comprises at least one acrylic polymer, vinyl polymer, or polyurethane.

17. The retroreflective sheeting of claim 15 wherein the adhesive layer between the topcoat and the lenses comprises a partially cured urethane and the topcoat comprises at least one acrylic polymer, vinyl polymer, or polyurethane.

18. The retroreflective sheeting of claim 1 further comprising a pressure sensitive adhesive underlying and in contact with the bottom surface of the reflective layer.

19. An image-containing retroreflective sheeting comprising a monolayer of transparent glass microsphere lenses, a transparent polymeric spacing layer comprising a polyvinyl butyral, an acrylic polymer or copolymer, an aliphatic urethane polymer or a polyester and having a front surface and a back surface, the front surface contacting and substantially conforming to the bottom of the lenses wherein the spacing layer comprises one or more segments comprising a transparent polymer having a refractive index which differs from the refractive index of the spacing layer, a reflective layer having a top surface and a bottom surface where the top surface is in contact with the back surface of the spacing layer, and a topcoat overlying and conforming to the top surfaces of the lenses and having a flat top surface or face.

20. The retroreflective sheeting of claim 19 wherein the spacing layer comprises a polyvinyl butyral.

21. The retroreflective sheeting of claim 20 wherein the segments comprise a polyester.

22. The retroreflective sheeting of claim 19 wherein the spacing layer comprises a polyester.

23. The retroreflective sheeting of claim 22 wherein the segments comprise a polyvinyl butyral.

24. The retroreflective sheeting of claim 19 wherein the refractive index of the spacing layer differs from the refractive index of the segments by a value of at least about 0.04.

25. The retroreflective sheeting of claim 19 wherein the topcoat comprises a polyurethane.

26. The retroreflective sheeting of claim 19 wherein the microspheres have an average refractive index in the range of about 2.1 to about 2.3.

27. The retroreflective sheeting of claim 19 wherein the microspheres are glass microspheres with an average diameter in a range of from about 30 to about 120 microns.

28. The retroreflective sheeting of claim 19 wherein the coating thickness of the polymeric spacing layer is from about 25% to about 100% of the average diameter of the microsphere lenses.

29. The retroreflective sheeting of claim 19 wherein the topcoat has a thickness from about 25 microns to about 300 microns.

30. The retroreflective sheeting of claim 19 further comprising a pressure sensitive adhesive layer underlying and in contact with the reflective layer.

31. A method of making a retroreflective sheeting with a image comprising the steps:

(1) printing an image using a transparent or transparently colored polymer onto a molding layer surface of a first assembly which comprises a molding layer and a substrate, (2) coating a transparent polymeric spacing layer on the imaged surface of the molding layer wherein the refractive index of the polymer of the spacing layer is different from the refractive index of the polymer of the image, (3) depositing a monolayer of transparent microsphere lenses onto the transparent polymeric spacing layer, (4) embedding the monolayer of microsphere lenses by means of heat and pressure into the transparent polymeric spacing layer whereby the spacing layer adheres to and conforms to the bottom surface of the monolayer of transparent microsphere lenses displacing the molding layer but maintaining the image intact, (5) covering the exposed transparent microsphere lenses with a transparent topcoat, (6) removing the molding layer and substrate assembly thereby exposing the image and the bottom surface of the spacing layer, and (7) depositing a reflective layer over the image and the exposed surface of the transparent polymeric spacing layer.

32. The method of claim 31 in which the Vicat softening point of the molding layer is less than that of the transparent polymeric spacing layer.

33. The method of claim 31 wherein the molding layer comprises a polyolefin.

34. The method of claim 31 wherein the molding layer surface further comprises a silicone release layer on the molding layer.

35. A method of making a retroreflective sheeting with a image comprising the steps:

(1) printing an image using a transparent or transparently colored polymer onto a molding layer surface of a first assembly which comprises a molding layer and a substrate, (2) embedding the printed image into the molding layer surface, (3) coating a transparent polymeric spacing layer on the imaged surface of the molding layer wherein the refractive index of the polymer of the spacing layer is different from the refractive index of the polymer of the image, (4) depositing a monolayer of transparent microsphere lenses onto the transparent polymeric spacing layer, (5) embedding the monolayer of microsphere lenses by means of heat and pressure into the transparent polymeric spacing layer whereby the spacing layer adheres to and conforms to the bottom surface of the monolayer of transparent microsphere lenses displacing the molding layer but maintaining the image intact, (6) covering the exposed transparent microsphere lenses with a transparent topcoat, (7) removing the molding layer and substrate assembly thereby exposing the image and the bottom surface of the spacing layer, and (8) depositing a reflective layer over the exposed image and surface of the transparent polymeric spacing layer.

36. The method of claim 35 in which the Vicat softening point of the molding layer is less than that of the transparent polymeric spacing layer.

37. The method of claim 35 wherein the molding layer comprises a polyolefin.

38. A method of claim 35 wherein the molding layer surface further comprises a silicone release layer on the molding layer.

39. The method of claim 35 wherein an adhesive layer is applied to the exposed surface of the reflective layer resulting from step 8.

* * * * *